(12) United States Patent
DeTar et al.

(10) Patent No.: US 7,087,558 B2
(45) Date of Patent: Aug. 8, 2006

(54) PROCESS FOR REACTING LARGE HYDROPHOBIC MOLECULES WITH SMALL HYDROPHILIC MOLECULES

(75) Inventors: Marvin B. DeTar, Wickliffe, OH (US); John C. Smoggie, Concord, OH (US); Richard M. Lange, Euclid, OH (US)

(73) Assignee: The Lubrizol Corporation, Wickliffe, OH (US)

(*) Notice: Subject to any disclaimer, the term of this patent is extended or adjusted under 35 U.S.C. 154(b) by 205 days.

(21) Appl. No.: 10/257,809

(22) PCT Filed: May 17, 2001

(86) PCT No.: PCT/US01/15917

§ 371 (c)(1),
(2), (4) Date: Oct. 15, 2002

(87) PCT Pub. No.: WO01/87994

PCT Pub. Date: Nov. 22, 2001

(65) Prior Publication Data

US 2003/0224952 A1 Dec. 4, 2003

Related U.S. Application Data

(60) Provisional application No. 60/205,214, filed on May 18, 2000.

(51) Int. Cl.
*C10M 101/00* (2006.01)
*C08F 212/08* (2006.01)
*C07C 69/66* (2006.01)

(52) U.S. Cl. .................... 508/465; 525/333.3; 560/193
(58) Field of Classification Search ................ 508/465; 525/333.3; 560/193
See application file for complete search history.

(56) References Cited

U.S. PATENT DOCUMENTS

| | | | |
|---|---|---|---|
| 3,954,808 A | 5/1976 | Elliott et al. | 260/343.2 R |
| 4,412,041 A | 10/1983 | Kitahara et al. | 525/154 |
| 5,281,347 A | 1/1994 | Igarashi et al. | 252/42.7 |
| 5,554,742 A | 9/1996 | Wolf et al. | 536/18 |
| 5,777,025 A | 7/1998 | Spencer et al. | 524/745 |
| 6,020,500 A | 2/2000 | Baker et al. | 549/292 |
| 6,677,282 B1 * | 1/2004 | Lange et al. | 508/452 |

FOREIGN PATENT DOCUMENTS

| | | |
|---|---|---|
| EP | 014 288 | 8/1980 |
| EP | 099 478 | 2/1984 |
| EP | 542 380 | 5/1993 |
| EP | 882 745 | 12/1998 |
| EP | 882 782 | 12/1998 |
| EP | 902 023 | 3/1999 |
| EP | 987 278 | 3/2000 |
| FR | 723 838 | 4/1932 |

* cited by examiner

*Primary Examiner*—Cecilia J. Tsang
*Assistant Examiner*—Taylor Victor Oh
(74) *Attorney, Agent, or Firm*—David M. Shold; Michael F. Esposito

(57) ABSTRACT

A process for reacting relatively small hydrophilic carboxylic molecules with relatively large, hydrophobic hydrocarbon based molecules, said process comprising conducting the reacting in the presence of a sulfonic acid catalyst having solubilizing properties. In a preferred embodiment the large hydrophobic molecule comprises at least one member of the group consisting of (1) olefinically unsaturated hydrocarbons containing at least about 10 carbon atoms and (2) aliphatic hydrocarbyl group substituted hydroxy aromatic compounds wherein the aliphatic hydrocarbyl group contains at least 12 carbon atoms and the small hydrophilic molecule comprises a carboxylic reactant selected from the group consisting of compounds of the formula $$R^3C(O)(R^4)_nC(O)OR^5$$

wherein each of $R^3$ and $R^5$ is independently H or a hydrocarbyl group, $R^4$ is a divalent hydrocarbylene group, and n is 0 or 1, and reactive sources thereof.

23 Claims, No Drawings

US 7,087,558 B2

PROCESS FOR REACTING LARGE HYDROPHOBIC MOLECULES WITH SMALL HYDROPHILIC MOLECULES

This application claims the benefit of Provisional Application No. 60/205,214 filed May 18, 2000.

FIELD OF THE INVENTION

This invention relates to a process for reacting large hydrophobic molecules with small hydrophilic molecules. More specifically, the process involves conducting the reaction in the presence of a sulfonic acid having solubilizing properties.

BACKGROUND OF THE INVENTION

Many reactions, such as the Prins reaction, wherein olefinic materials are reacted with aldehydes, are conducted in the presence of acidic catalysts. The acidic catalysts are generally selected from materials such as para-toluenesulfonic acid, methane sulfonic acid, $H_2SO_4$, $H_3PO_4$, HCl and the like. When one of the reactants is a relatively large, hydrophobic molecule and one is a relatively small, hydrophilic molecule, the reaction, catalyzed by these materials, may be slow because of difficulty in securing and maintaining sufficient contact between the reactants.

It has now been found that replacing these commonly used catalysts with higher molecular weight, more oleophilic, sulfonic acids results in reduced processing time and improved conversion of reactants.

In U.S. Pat. No. 3,954,808 the reaction of alkyl phenol with glyoxylic acid is described. Examples are given of the reaction with paratoluene sulfonic acid and with $H_2SO_4$ catalysts.

The reaction of alkyl phenols with glyoxylic reactants in the presence of methane sulfonic acid is described in U.S. Pat. No. 5,281,346.

U.S. Pat. No. 6,020,500 describes reactions of olefinic compounds with certain carboxylic reactants, including glyoxylic acid, in the presence of an acidic catalyst. Methane sulfonic acid, paratoluene sulfonic acid, heteropolyacids and mineral acids are illustrated.

The preparation of alkyl glycosides by reaction of aqueous glycoses having a water content of 10–80% by weight with aliphatic primary alcohols having from 5 to 30 carbon atoms in the presence of the acidic form of an anionic surfactant used as an acidic catalyst having emulsifying properties is described in U.S. Pat. No. 5,554,742. The patent does not describe reaction of relatively large hydrophobic molecules with relatively small hydrophilic molecules.

The improvement of a rubber having an unsaturated carbon linkage comprising reacting the rubber with an organic compound having a carboxyl group and an aldehyde group in the presence of an acid catalyst is described in U.S. Pat. No. 4,412,041. Acid catalysts include protonic acids such as $H_2SO_4$, nitric acid, chlorosulfonic acid, p-toluenesulfonic acid and hydrohalic acids, and Lewis acids.

While the above illustrated catalysts have been moderately successful, the catalysts of the present invention allow intimate mixing of hydrophobic and the hydrophilic media so that side reactions that occur in one phase or the other are minimized.

The process of this invention is useful for preparation of intermediates for further reaction to prepared dispersants and dispersant viscosity improvers for lubricating oil compositions. The products obtained by the process of this invention also find utility as additives for lubricating oil compositions.

SUMMARY OF THE INVENTION

This invention relates to a process for reacting relatively small hydrophilic carboxylic molecules with relatively large, hydrophobic hydrocarbon based molecules, said process comprising conducting the reacting in the presence of a sulfonic acid catalyst having solubilizing properties.

DETAILED DESCRIPTION OF THE PREFERRED EMBODIMENTS

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is they are essentially free of atoms other than carbon and hydrogen.

The expression "lower" is often used to define the size of a hydrocarbon group. The expression means the group contains no more than 7 carbon atoms. For example, "lower" alkyl groups contain up to seven carbon atoms and include, for example, methyl, ethyl, propyl, butyl, pentyl, hexyl and heptyl groups, including isomers thereof.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat. No. 4,320,019 which is expressly incorporated herein by reference for relevant teachings in this regard.

It must be noted that as used in this specification and appended claims, the singular forms also include the plural unless the context clearly dictates otherwise. Thus the singular forms "a", "an", and "the" include the plural; for example "an amine" includes mixtures of amines of the same type. As another example the singular form "amine" is intended to include both singular and plural unless the context clearly indicates otherwise.

The Hydrophilic Carboxylic Molecules

The hydrophilic carboxylic molecule is at least one member selected from the group consisting of compounds of the formula $$R^3C(O)(R^4)_nC(O)OR^5 \qquad (IV)$$

wherein each of $R^3$ and $R^5$ is independently H or a hydrocarbyl group, preferably H or lower alkyl, $R^4$ is a divalent hydrocarbylene group, and n is 0 or 1, and reactive sources thereof. Most preferably $R^3$ is H.

Reactive sources include compounds of the formula

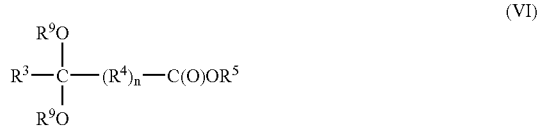
(VI)

wherein each of $R^3$ and $R^5$ and each $R^9$ is independently H or a hydrocarbyl group, $R^4$ is a divalent hydrocarbylene group, and n is 0 or 1. These include acetals, ketals, hemiacetals and hemiketals of (IV) and esters thereof. Highly preferred are the compounds wherein one of $R^9$ is hydrocarbyl and one is H:

(V)

wherein each of $R^3$ and $R^5$ is independently H or a hydrocarbyl group, especially wherein the hydrocarbyl group is lower alkyl. $R^4$ is a divalent hydrocarbylene group, preferably lower alkylene, $R^9$ is hydrocarbyl, preferably lower alkyl, and n is 0 or 1, preferably 0. Especially preferred are the glyoxylate lower alkyl ester, lower alkyl hemiacetals. Cyclic trimers are useful.

The carboxylic reactant may be a compound of the formula

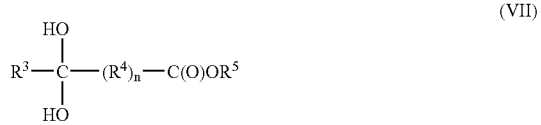
(VII)

wherein each of $R^3$ and $R^5$ is independently H or alkyl. Such compounds may arise when the carboxylic acid or ester reactant is hydrated.

$R^3$ is usually H or an aliphatic group, that is, alkyl or alkenyl, preferably alkyl, more preferably lower alkyl. Especially preferred is where $R^3$ is H or methyl, most preferably, H.

$R^4$ is a divalent hydrocarbylene group. This group may be aliphatic or aromatic, but is usually aliphatic. Often, $R^4$ is an alkylene group containing from 1 to about 3 carbon atoms. The 'n' is 0 or 1; that is, in one embodiment $R^4$ is present and in another embodiment, $R^4$ is absent. More often, $R^4$ is absent.

When $R^5$ is hydrocarbyl, it is usually an aliphatic group, often a group containing from 1 to about 30 carbon atoms, often from 8 to about 18 carbon atoms. In another embodiment, $R^5$ is lower alkyl, wherein "lower alkyl" is defined hereinabove. Most often, $R^5$ is H or lower alkyl, especially methyl, ethyl, propyl and butyl.

Examples of carboxylic reactants are glyoxylic acid, and other oxoalkanoic acids, glyoxylic acid hydrate, keto alkanoic acids such as pyruvic acid, levulinic acid, ketovaleric acids, ketobutyric acids, esters thereof, preferably the lower alkyl esters, the methyl hemiacetal of methyl glyoxylate, 4-formylbenzoic acid, 4-formylphenoxyacetic acid, esters thereof, carboxy benzaldehyde, the hemiacetals and hemiketals of aldehydoalkanoic acids such as glyoxylic acid and keto alkanoic acids such as pyruvic, levulinic, ketovaleric, and ketobutyric acids, and the corresponding acetals and ketals, and numerous others. The skilled worker, having the disclosure before him, will readily recognize the appropriate carboxylic reactant to employ to generate a given intermediate. Preferred carboxylic reactants are those that will lead to preferred products of this invention.

In a preferred embodiment, $R^3$ and one $R^9$ are hydrogen and the other $R^9$ and $R^5$ are methyl. In this preferred embodiment, the reactant is represented by the structure

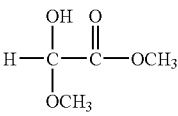

and known as glyoxylic acid methyl ester methylhemiacetal. It is marketed by DSM Fine Chemicals.

The Hydrophobic Molecules

The hydrophobic molecules are relatively large hydrocarbon based molecules. Olefinically unsaturated hydrocarbons containing at least about 10 carbon atoms and aliphatic hydrocarbyl group substituted hydroxy aromatic compounds wherein the aliphatic hydrocarbyl group contains at least 12 carbon atoms are defined herein as relatively large hydrophobic molecules. By virtue of the presence of the hydroxyl group, a hydroxy aromatic compound is generally more hydrophilic than a corresponding olefinically unsaturated hydrocarbon. However, in every case, the relatively small carboxylic compound is more hydrophilic than the relatively large hydrophobic molecule.

As noted above, hydrophobic molecules include olefinically unsaturated hydrocarbons containing at least about 10 carbon atoms and aliphatic hydrocarbyl group substituted hydroxy aromatic compounds wherein the aliphatic hydrocarbyl group contains at least 12 carbon atoms Olefinically Unsaturated Hydrocarbon Olefinically unsaturated hydrocarbons employed as a reactant in the process of this invention have the general formula $(R^1)(R^2)C=C(R^6)(CH(R^7)(R^8))$ (III)

wherein each of $R^1$ and $R^2$ is, independently, hydrogen or a hydrocarbon based group and each of $R^6$, $R^7$ and $R^8$ is, independently, hydrogen or a hydrocarbon based group. These compounds are diverse in nature. Virtually any compound containing an olefinic bond may be used provided it meets the general requirements set forth hereinabove for (III) and does not contain any functional groups (e.g., primary or secondary amines) that would interfere with the reaction with the carboxylic reactant.

The olefinically unsaturated hydrocarbon contains at least about 10 carbon atoms up to about 40,000 carbon atoms. Weight average molecular weights ($\overline{M}_w$) of the olefinically unsaturated hydrocarbon range from about 150, frequently from about 200, often from about 10,000 up to about 500,000, more often up to about 400,000 and frequently up to about 200,000.

Molecular weights of the olefinically unsaturated hydrocarbons are determined using well known methods described in the literature. Examples of procedures for determining molecular weights are gel permeation chromatography (GPC) (also known as size-exclusion chromatography) and vapor phase osmometry (VPO). These and other procedures are described in numerous publications including:

P. J. Flory, "Principles of Polymer Chemistry", Cornell University Press (1953), Chapter VII, pp 266–316, "Macromolecules, an Introduction to Polymer Science", F. A. Bovey and F. H. Winslow, Editors, Academic Press (1979), pp 296–312, and W. W. Yau, J. J. Kirkland and D. D. Bly, "Modern Size Exclusion Liquid Chromatography", John Wiley and Sons, New York, 1979.

Unless otherwise indicated, GPC molecular weights referred to herein are polystyrene equivalent weights, i.e., are molecular weights determined employing polystyrene standards.

A measurement which is complementary to a polymer's molecular weight is the melt index (ASTM D-1238). Polymers of high melt index generally have low molecular weight, and vice versa. The polymers of the present invention preferably have a melt index of up to 20 dg/min., more preferably 0.1 to 10 dg/min.

These publications are hereby incorporated by reference for relevant disclosures contained therein relating to the determination of molecular weight.

When the molecular weight of a polymer is greater than desired, it may be reduced by techniques known in the art. Such techniques include mechanical shearing of the polymer employing masticators, ball mills, roll mills, extruders and the like. Oxidative or thermal shearing or degrading techniques are also useful and are known. Details of numerous procedures for shearing polymers are given in U.S. Pat. No. 5,348,673 which is hereby incorporated herein by reference for relevant disclosures in this regard. Reducing molecular weight also tends to improve the subsequent shear stability of the polymer.

Useful olefinically unsaturated compounds may be terminal olefins, i.e., olefins having a $H_2C=C<$ group, or internal olefins. They may have more than one olefinic bond, i.e., they may be dienes, trienes, etc. Most often, they are mono-olefinic. Examples include linear α-olefins, cis- or trans- disubstituted olefins, trisubstituted and tetrasubstituted olefins.

Mono-olefinic compounds contain one equivalent of $C=C$ per mole; di-olefinic compounds contain 2 equivalents of $C=C$ bonds per mole; tri-olefinic compounds contain 3 equivalents of $C=C$ bonds per mole, and so forth.

Aromatic double bonds are not considered to be olefinic double bonds within the context of this invention.

As used herein, the expression "polyolefin" defines a polymer derived from olefins. As used herein, the expression 'polymer' refers to polymers of all types, i.e., homopolymers and copolymers. The term homopolymer refers to polymers derived from essentially one monomeric species; copolymers are defined herein as being derived from 2 or more monomeric species. Thus, as defined herein, copolymers include polymers derived from, for example, 2, 3, 4 or more different monomers, more often 2 or 3 different monomers.

Among useful compounds are those that are purely hydrocarbon, i.e., those substantially free of non-hydrocarbon groups, or they may contain one or more non-hydrocarbon groups as discussed in greater detail herein.

The olefinically unsaturated hydrocarbons contains from about 10, frequently from about 30, often from about 50 carbon atoms up to about 40,000, frequently to about 30,000 carbon atoms often to about 6,000 carbon atoms.

In one embodiment, the olefinically unsaturated hydrocarbon comprises an alpha-olefin. These may contain from about 10 to about 30 carbon atoms and may be linear or branched, more often linear.

In another embodiment, the olefinically unsaturated hydrocarbon is an olefin polymer, preferably an alpha-olefin polymer. These polymers are preferably polymers of olefins having from 2 to about 28 carbon atoms. Usually they are copolymers, more preferably copolymers of ethylene and at least one α-olefin having from 3 to about 28 carbon atoms. Examples include monoolefins such as propylene, 1-butene, isobutene, 1-pentene, 1-hexene, 1-heptene, 1-octene, 1-nonene, 1-decene, etc. Preferably, the polymer of olefins is an ethylene-propylene copolymer.

The ethylene content is preferably in the range of 20 to 80 percent by weight, and more preferably 30 to 70 percent by weight. When propylene and/or 1-butene are employed as comonomer(s) with ethylene, the ethylene content of such copolymers is most preferably 45 to 65 percent, although higher or lower ethylene contents may be present. Most preferably, these polymers are substantially free of ethylene homopolymer, although they may exhibit a degree of crystallinity due to the presence of small crystalline polyethylene segments within their microstructure.

In one particular embodiment, the polymer is a homopolymer derived from a butene, particularly, isobutylene. Especially preferred is where the polymer comprises terminal vinylidene olefinic double bonds. In one preferred embodiment, the polymer is a polyisobutylene wherein at least about 30%, often at least 50% and frequently at least about 80% of the polymeric chains have terminal vinylidene groups. In another preferred embodiment, the polymer is a polyisobutylene wherein less than about 10% of the polymeric chains have terminal vinylidene groups.

Another useful olefinically unsaturated hydrocarbon is one derived from olefins, especially lower olefins, and polyenes, usually dienes. Preferred olefins are alpha olefins. Polyenes may be non-conjugated or conjugated, usually non-conjugated. Useful olefins and dienes are the same as those described hereinabove and hereinafter in discussions of other polymer types. Preferably, the olefinically unsaturated hydrocarbon is an ethylene-$C_{3-28}$ olefin-polyene copolymer.

In one embodiment, the olefinically unsaturated hydrocarbon is an ethylene-lower olefin-diene copolymer. As used herein, the term lower refers to groups or compounds containing no more than 7 carbon atoms. Especially preferred are ethylene-propylene-diene, preferably non-conjugated diene, copolymers. non-conjugated dienes such as 1,4-hexadiene, 1,4-cyclohexadiene, 5-ethylidene-2-norbornene and 1,6-octadiene: and trienes such as 1-isopropylidene-3a,4,7,7a-tetrahydroindene, 1-isopropylidene-dicyclopentadiene and 2-(2-methylene-4-methyl-3-pentenyl) [2.2.1]bicyclo-5-heptene.

In another embodiment, the olefinically unsaturated hydrocarbon comprises a diene-vinyl aromatic copolymer. The dienes are usually conjugated dienes. The vinyl substituted aromatics generally contain from 8 to about 20 carbons, preferably from 8 to 12 carbon atoms and most preferably, 8 or 9 carbon atoms.

Examples of vinyl substituted aromatics include vinyl anthracenes, vinyl naphthalenes and vinyl benzenes (styrenic compounds). Styrenic compounds are preferred, examples being styrene, alpha-methystyrene, ortho-methyl styrene, meta-methyl styrene, para-methyl styrene, para-tertiary-butylstyrene, with styrene being preferred.

The conjugated dienes generally have from 4 to about 10 carbon atoms and preferably from 4 to 6 carbon atoms. Examples of conjugated dienes include piperylene, 2,3-dimethyl-1,3-butadiene, chloroprene, isoprene and 1,3-butadiene, with isoprene and 1,3-butadiene being particularly preferred. Mixtures of such conjugated dienes are useful.

The diene-vinyl aromatic copolymer, and in particular, styrene-diene copolymers, can be random copolymers or block copolymers, which include regular block copolymers or random block copolymers. Random copolymers are those in which the comonomers are randomly, or nearly randomly, arranged in the polymer chain with no significant blocking of homopolymer of either monomer. Regular block copolymers are those in which a small number of relatively long chains of homopolymer of one type of monomer are alternately joined to a small number of relatively long chains of homopolymer of another type of monomer. Random block copolymers are those in which a larger number of relatively short segments of homopolymer of one type of monomer alternate with relatively short segments of homopolymer of another monomer.

The vinyl substituted aromatic content of these copolymers is typically in the range of about 20% to about 70% by weight, preferably about 40% to about 60% by weight. The aliphatic conjugated diene content of these copolymers is typically in the range of about 30% to about 80% by weight, preferably about 40% to about 60% by weight.

Hydroxy Aromatic Compounds

Hydroxyaromatic compounds, at least some of the units of which are aliphatic hydrocarbyl-substituted having at least 12 carbon atoms in the hydrocarbyl substituent, are useful large hydrophobic molecules.

The aromatic group of the hydroxyaromatic compound can be a single aromatic nucleus such as a benzene nucleus, a pyridine nucleus, a thiophene nucleus, a 1,2,3,4-tetrahydronaphthalene nucleus, etc., or a polynuclear aromatic moiety. Such polynuclear moieties can be of the fused type; that is, wherein pairs of aromatic nuclei making up the aromatic group share two points, such as found in naphthalene, anthracene, the azanaphthalenes, etc. Polynuclear aromatic moieties also can be of the linked type wherein at least two nuclei (either mono or polynuclear) are linked through bridging linkages to each other. Such bridging linkages can be chosen from the group consisting of carbon-to-carbon single bonds between aromatic nuclei, ether linkages, keto linkages, sulfide linkages, polysulfide linkages of 2 to 6 sulfur atoms, sulfinyl linkages, sulfonyl linkages, methylene linkages, alkylene linkages, di-(lower alkyl) methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages. In certain instances, more than one bridging linkage can be present in the aromatic group between aromatic nuclei. For example, a fluorene nucleus has two benzene nuclei linked by both a methylene linkage and a covalent bond. Such a nucleus may be considered to have 3 nuclei but only two of them are aromatic. Normally, the aromatic group will contain only carbon atoms in the aromatic nuclei per se, although other non-aromatic substitution, such as in particular short chain alkyl substitution can also be present. Thus methyl, ethyl, propyl, and t-butyl groups, for instance, can be present on the aromatic groups, even though such groups may not be explicitly represented in structures set forth herein.

This reactant, being a hydroxy aromatic compound, can be referred to as a phenol. When the term "phenol" is used herein, however, it is to be understood, depending on the context, that this term need not limit the aromatic group of the phenol to benzene, although benzene may be the preferred aromatic group. Rather, the term is to be understood in its broader sense to include, depending on the context, for example, substituted phenols, hydroxy naphthalenes, and the like. Thus, the aromatic group of a "phenol" can be mononuclear or polynuclear, substituted, and can include other types of aromatic groups as well.

Specific examples of single ring aromatic moieties are the following:

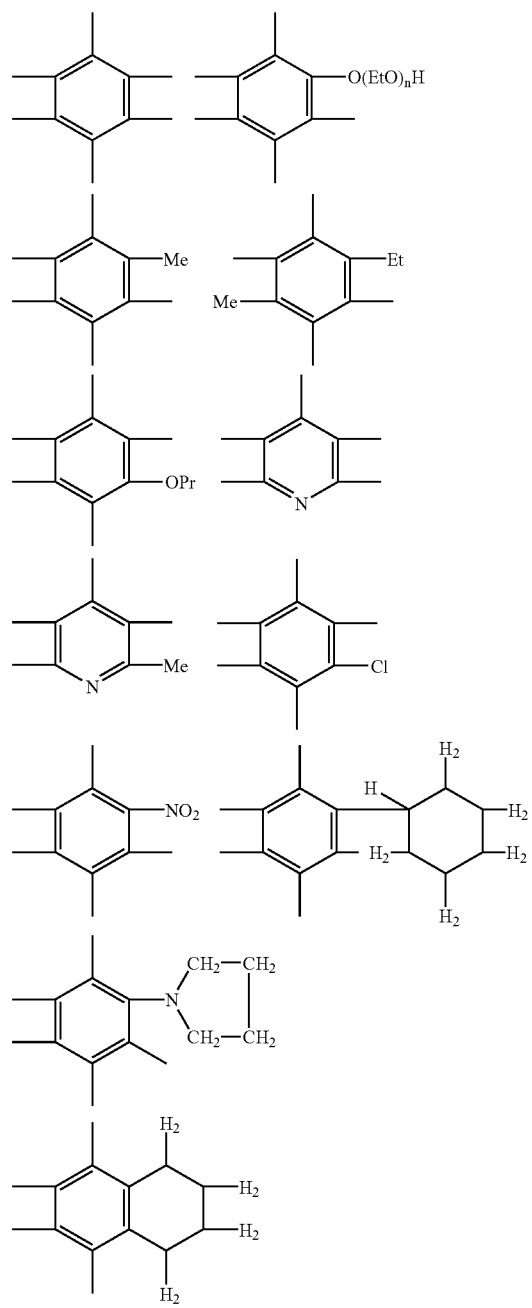

etc., wherein Me is methyl, Et is ethyl or ethylene, as appropriate, and Pr is n-propyl.

Specific examples of fused ring aromatic moieties are:

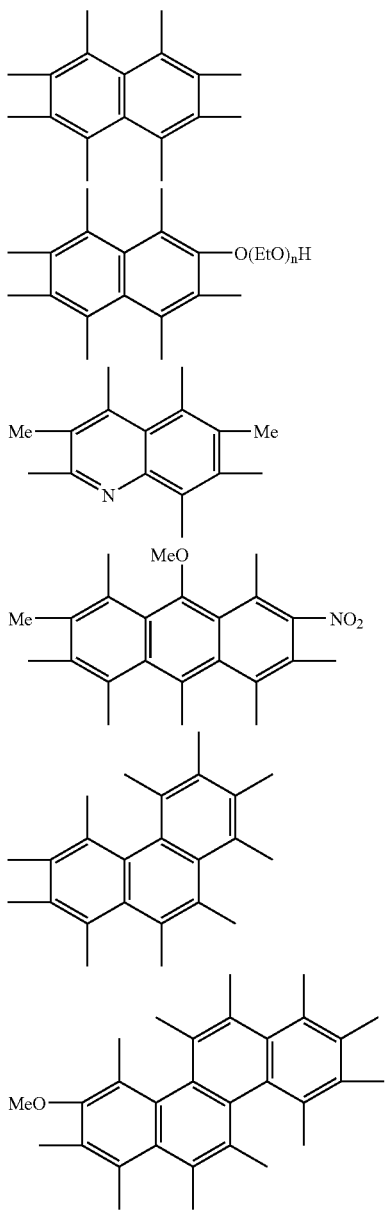

etc.

When the aromatic moiety is a linked polynuclear aromatic moiety, it can be represented by the general formula ar(-L-ar-)$_w$ wherein w is an integer of 1 to about 20, each ar is a single ring or a fused ring aromatic nucleus of 4 to about 12 carbon atoms and each L is independently selected from the group consisting of carbon-to-carbon single bonds between ar nuclei, ether linkages
(e.g. —O—), keto linkages (e.g., —C(=O)—), sulfide linkages (e.g., —S—), polysulfide linkages of 2 to 6 sulfur atoms (e.g., —S—$_{2-6}$), sulfinyl linkages (e.g., —S(O)—), sulfonyl linkages (e.g., —S(O)$_2$—), lower alkylene linkages (e.g., —CH$_2$—,

—CH$_2$—CH$_2$—, —CH$_2$—CH(R)— )

mono(lower alkyl)-methylene linkages (e.g., —CHR°—), di(lower alkyl)-methylene linkages (e.g.,—CR°$_2$—), lower alkylene ether linkages (e.g., —CH$_2$O—, —CH$_2$O—CH$_2$—, —CH$_2$—CH$_2$O—, —CH$_2$CH$_2$OCH$_2$CH$_2$—, —CH$_2$CHOCH$_2$CH— with R° substituents, —CH$_2$CHOCHCH$_2$— with R° substituents, etc.), lower alkylene sulfide linkages (e.g., wherein one or more —O—'s in the lower alkylene ether linkages is replaced with a S atom), lower alkylene polysulfide linkages (e.g., wherein one or more —O— is replaced with a —S$_{2-6}$— group), amino linkages

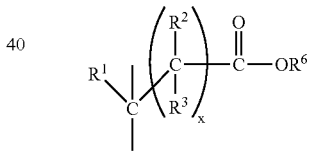

—CH$_2$NCH$_2$—, -alk-N—, where alk is lower alkylene, etc.), polyamino linkages (e.g., —N(alkN)$_{1-10}$, where the unsatisfied free N valences are taken up with H atoms or R° groups), linkages derived from oxo- or keto-carboxylic acids (e.g.)

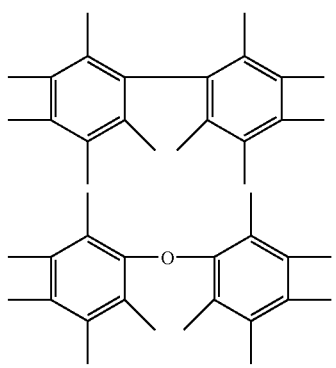

wherein each of R$^1$, R$^2$ and R$^3$ is independently hydrocarbyl, preferably alkyl or alkenyl, most preferably lower alkyl, or H, R$^6$ is H or an alkyl group and x is an integer ranging from 0 to about 8, and mixtures of such bridging linkages (each R being a lower alkyl group).

Specific examples of linked moieties are:

-continued

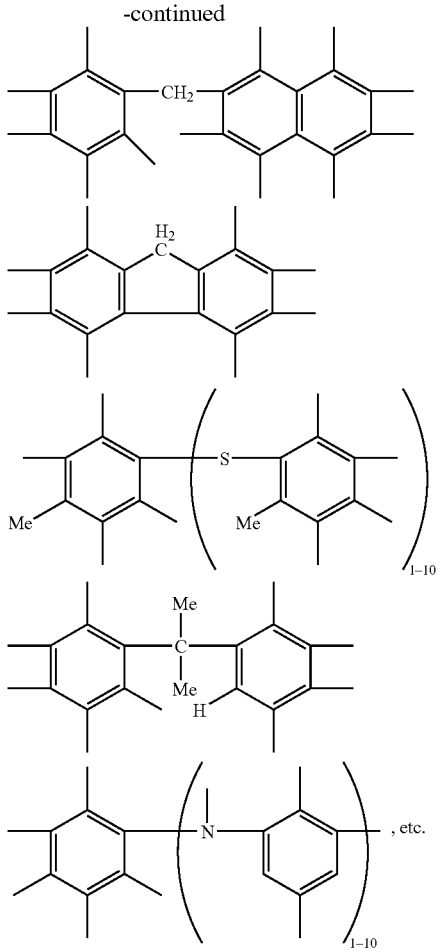

Usually all of these Ar groups have no substituents except for those specifically named. For such reasons as cost, availability, performance, etc., the aromatic group is normally a benzene nucleus, a lower alkylene bridged benzene nucleus, or a naphthalene nucleus. Most preferably the aromatic group is a benzene nucleus.

This first reactant is a hydroxyaromatic compound, that is, a compound in which at least one hydroxy group is directly attached to an aromatic ring. The number of hydroxy groups per aromatic group will vary from 1 up to the maximum number of such groups that the hydrocarbyl-substituted aromatic moiety can accommodate while still retaining at least one, and preferably at least two, positions, at least some of which are preferably adjacent (ortho) to a hydroxy group, which are suitable for further reaction by condensation with aldehydes (described in detail below). Thus most of the molecules of the reactant will have at least two unsubstituted positions. Suitable materials can include, then, hydrocarbyl-substituted catechols, resorcinols, hydroquinones, and even pyrogallols and phloroglucinols. Most commonly each aromatic nucleus, however, will bear one hydroxyl group and, in the preferred case when a hydrocarbyl substituted phenol is employed, the material will contain one benzene nucleus and one hydroxyl group. Of course, a small fraction of the aromatic reactant molecules may contain zero hydroxyl substituents. For instance, a minor amount of non-hydroxy materials may be present as an impurity. However, this does not defeat the spirit of the inventions, so long as the starting material is functional and contains, typically, at least one hydroxyl group per molecule.

The hydroxyaromatic reactant is similarly characterized in that at least some of the units of which are aliphatic hydrocarbyl substituted. Typically most or all of the molecules are aliphatic hydrocarbyl substituted. If the hydroxyaromatic compound comprises bridged ring units, then substantially all such units are hydroxyl- and aliphatic hydrocarbyl-substituted; that is, each ring unit which is linked by a bridging group to another ring unit will have at least one hydroxyl substituent and at least one aliphatic hydrocarbyl substituent. The term "aliphatic hydrocarbyl substituent" or "aliphatic hydrocarbyl group" is used herein in its ordinary sense, which is well-known to those skilled in the art. Specifically, it refers to a group having an aliphatic carbon atom directly attached to the remainder of the molecule and having predominantly hydrocarbon character. The aliphatic hydrocarbyl groups contain at least 12 carbon atoms up to about 750 carbon atoms. Examples of aliphatic hydrocarbyl groups include:

(1) hydrocarbon substituents, that is, aliphatic (e.g., alkyl or alkenyl), alicyclic (e.g., cycloalkyl, cycloalkenyl) substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

Each aliphatic hydrocarbyl group contains at least about 12, often from about 24 carbon atoms, frequently from about 30 carbon atoms, and often from about 50 carbon atoms, up to about 750 carbon atoms, frequently to about 600 carbon atoms, preferably to about 400 carbon atoms and more preferably to about 100 carbons. The aliphatic hydrocarbyl group is preferably alkyl or alkenyl, preferably substantially saturated alkenyl. In one preferred embodiment, the aliphatic hydrocarbyl group contains at least about 12 carbon atoms, often from about 12 to about 100 carbons. In another embodiment, each aliphatic hydrocarbyl group contains an average of at least about 30 carbon atoms, often an average of from about 30 to about 100 carbons. In another embodiment, the aliphatic hydrocarbyl group contains from 12 to about 50 carbon atoms. In a further embodiment, the aliphatic hydrocarbyl group contains from about 8 to about 24 carbon atoms, preferably from about 12 to about 24 carbon atoms and more preferably from about 12 to about 18 carbon atoms. In one embodiment, at least one aliphatic hydrocarbyl group is derived from an alkane or alkene having number average molecular weight ranging from about 300 to about 800. In another embodiment, R contains an average of at least about 50 carbon atoms often from about 50 up to about 300, preferably up to about 100 carbon atoms.

When the aliphatic hydrocarbyl group is an alkyl or alkenyl group having from about 12 to about 28 carbon atoms, it is typically derived from the corresponding olefin;

for example, a dodecyl group is derived from dodecene, an octyl group is derived from octene, etc. When the aliphatic hydrocarbyl group is a group having at least about 30 carbon atoms, it is frequently an aliphatic group made from homo- or interpolymers (e.g., copolymers, terpolymers) of mono- and di-olefins having 2 to 10 carbon atoms, such as ethylene, propylene, butene-1, isobutene, butadiene, isoprene, 1-hexene, 1-octene, etc. Typically, these olefins are 1-mono olefins such as homopolymers of ethylene. These aliphatic hydrocarbyl groups may also be derived from halogenated (e.g., chlorinated or brominated) analogs of such homo- or interpolymers. Aliphatic hydrocarbyl groups can, however, be derived from other sources, such as monomeric high molecular weight alkenes (e.g., 1-tetracontene) and chlorinated analogs and hydrochlorinated analogs thereof, aliphatic petroleum fractions, particularly paraffin waxes and cracked and chlorinated analogs and hydrochlorinated analogs thereof, white oils, synthetic alkenes such as those produced by the Ziegler-Natta process (e.g., poly(ethylene) greases) and other sources known to those skilled in the art. Any unsaturation in the aliphatic hydrocarbyl groups may be reduced or eliminated by hydrogenation according to procedures known in the art.

In one preferred embodiment, at least one aliphatic hydrocarbyl group is derived from polybutene. In another preferred embodiment, the aliphatic hydrocarbyl group is derived from polypropylene. In a further preferred embodiment, the aliphatic hydrocarbyl group is a propylene tetramer.

Preferably the aliphatic hydrocarbyl group is an alkyl group. Typically the alkyl group will contain from about 12 to about 750 carbon atoms often to about 400 carbon atoms, preferably about 12 to about 100 carbon atoms. Alternatively expressed, the alkyl groups can have a number average molecular weight of about 150 to about 10,000, often to about 2000, preferably about 200 to about 1200.

In yet another embodiment, the alkylphenol component is a mixture of alkyl phenols, wherein some molecules contain alkyl substituents of 4 to 8 carbon atoms, such as a tertiary-alkyl (e.g., t-butyl) group, and some molecules contain alkyl substituents of about 12 or more, up to 400 carbon atoms.

More than one such hydrocarbyl group can be present, but usually no more than 2 or 3 are present for each aromatic nucleus in the aromatic group.

The attachment of a hydrocarbyl group to the aromatic moiety can be accomplished by a number of techniques well known to those skilled in the art. One particularly suitable technique is the Friedel-Crafts reaction, wherein an olefin (e.g., a polymer containing an olefinic bond), or halogenated or hydrohalogenated analog thereof, is reacted with a phenol in the presence of a Lewis acid catalyst. Methods and conditions for carrying out such reactions are well known to those skilled in the art. See, for example, the discussion in the article entitled, "Alkylation of Phenols" in "Kirk-Othmer Encyclopedia of Chemical Technology", Third Edition, Vol. 2, pages 65–66, Interscience Publishers, a division of John Wiley and Company, N.Y. Other equally appropriate and convenient techniques for attaching the hydrocarbon-based group to the aromatic moiety will occur readily to those skilled in the art.

Specific illustrative examples of aliphatic hydrocarbyl-substituted hydroxyaromatic compounds include aliphatic hydrocarbon substituted-phenols, naphthols, 2,2'-dihydroxybiphenyls, 4,4-dihydroxybiphenyls, 3-hydroxyanthracenes, 1,2,10-anthracenetriols, and resorcinols; 2-t-butyl phenols, 4-t-butyl phenols, 2,6-di-t-butyl phenols, cresols, etc., all having at least one aliphatic hydrocarbyl substituent as defined hereinabove. Some specific examples include propylene oligomer ($M_w$ 300–800)-substituted phenol, polybutene ($M_n$ about 1000) substituted phenol, substituted naphthols corresponding to the above exemplified phenols, methylene-bis-phenols, bis-(4-hydroxyphenyl)-2,2-propanes, and aliphatic hydrocarbon substituted bis-phenols wherein the aliphatic hydrocarbon substituents have at least about 12 carbon atoms, for example, dodecyl, oleyl, polybutenyl, etc., sulfide- and polysulfide-linked analogues of any of the above, alkoxylated derivatives of any of the above hydroxy aromatic compounds, etc.

Sulfonic Acid Catalysts

The sulfonic acids employed as catalysts in this invention are those that have solubilizing properties. They generally contain a sulfonic acid group bonded to a hydrocarbyl group that is more oleophilic than the methyl group on methane sulfonic acid or the tolyl group of p-toluene sulfonic acid. It is necessary that the sulfonic acids contains a sufficient size and number of aliphatic groups to render the acids solubilizing acids. Normally, aliphatic groups are alkyl and/or alkenyl groups, at least one of which contains at least about 6 carbon atoms, often at least 8 carbon atoms.

In one embodiment, the sulfonic acid catalyst is an aliphatic hydrocarbyl group substituted sulfonic acid containing at least 6 carbon atoms in the aliphatic hydrocarbyl group. In one preferred embodiment, the aliphatic hydrocarbyl group is an alkyl group containing from about 6, preferably from about 15 up to about 30 carbon atoms.

In another embodiment, the aliphatic hydrocarbyl group is an alkyl group substituted cycloaliphatic group.

In still another embodiment, the sulfonic acid catalyst is an aliphatic hydrocarbon group substituted aromatic sulfonic acid wherein the aliphatic hydrocarbon group contains from about 6 to about 30 carbon atoms. Preferably, the aliphatic hydrocarbyl group is an alkyl or alkenyl group. The aromatic group may be mono-nuclear, for example a benzene ring or poly-nuclear, for example fused ring aromatic groups such as naphthyl or linked ring aromatic such as biphenyl and diphenylmethane.

Petroleum sulfonic acids are a well known class of sulfonic acids. Petroleum sulfonic acids are obtained by treating refined or semi-refined petroleum oils with concentrated or fuming sulfuric acid. Depending on the nature of the oil from which they are prepared, these acids are oil soluble alkane sulfonic acids, cycloaliphatic sulfonic acids including cycloalkyl sulfonic acids and cycloalkene sulfonic acids, and alkyl alkaryl or aralkyl aromatic sulfonic acids. Illustrative examples of petrosulfonic acids include mahogany sulfonic acids, petrolatum sulfonic acids, white oil sulfonic acid, petroleum naphthalene sulfonic acid, etc.

The mono-, di- and tri-aliphatic hydrocarbon substituted aromatic sulfonic acids and the petroleum sulfonic acids are particularly preferred. Illustrative examples of suitable sulfonic acids include mahogany sulfonic acids, petrolatum sulfonic acids, $C_{12}$ substituted naphthalene sulfonic acids, mono- and di-dodecylbenzene sulfonic acids, sulfonic acids derived by the treatment of polyisobutylene having molecular weight of about 1500 with chlorosulfonic acid, paraffin wax sulfonic acid, cetyl-cyclopentane sulfonic acid, lauryl cyclohexane sulfonic acid, polyethylene sulfonic acid, alkylbenzene bottoms sulfonic acids, etc.

Alkyl benzene sulfonic acids are derived from benzene which has been alkylated with groups such as propylene tetramers and isobutylene trimers to introduce 1, 2, 3 or more branched chain $C_{12}$ substituents on the benzene ring. Dodecyl benzene bottoms, principally mixtures of monoand di-dodecyl benzenes are available as by-products from the manufacture of household detergents.

The manufacture of sulfonates from detergent-manufacture by-products is well known to those skilled in the art. See for example the section entitled "Sulfonation and Sulfation" in Kirk-Othmer 'Encyclopedia of Chemical Technology' 4th Edition, Vol. 23, pp. 146 et seq. Published by John Wiley & Sons, N.Y. (1997). See also the section entitled "Sulfonic Acids", ibid. pp 194 et. seq.

Particularly preferred are the linear alkyl benzene sulfonic acids (LABS). These are available commercially from Alfa Aesar, Ward Hill, Mass., USA.

Typically from about 1 mole %, often from about 2 mole %, up to about 6 mole %, often up to about 4 mole % sulfonic acid, relative to moles carboxylic reactant, are employed as catalysts. Highly preferred is about 3 mole %.

Many sulfonic acids of the type useful as catalysts in the process of the instant invention are described in several United States patents including, for example, U.S. Pat. No. 6,010,986 and U.S. Pat. No. 6,015,778, both of which are incorporated herein by reference for disclosures of sulfonic acids. It is to be understood that reference to these patents is only intended to illustrate sulfonic acids which are of the type useful as catalysts in the process of the instant invention. It is not intended that every sulfonic acid disclosed therein is considered useful as a catalyst, nor is it suggested that derivatives of the sulfonic acids described in these patents can also serve as catalysts.

The hydrophobic reactant and the hydrophilic reactant are typically used in molar amounts ranging from about 1:2 to about 3:1. However, when the hydrophobic molecule is olefinically unsaturated, the amount of hydrophilic reactant used per equivalent of hydrophobic reactant, wherein an equivalent is defined as the molecular weight of the hydrophobic molecule divided by the number of carbon to carbon double bonds contained therein, ranges from about 1 to about 100 moles hydrophilic reactant per equivalent of hydrophobic molecule, more often from about 1 or about 2, often from about 5 moles up to about 50, often up to about 20 and frequently up to about 10 moles of hydrophilic molecule is used per equivalent of hydrophobic molecule. Most preferably, from 1 to about 2 moles hydrophilic reactant are uses per equivalent of olefinic reactant.

Except when it is desired to remove undesired components such as low boiling reaction solvents, by products, etc, the process of this invention is typically conducted under atmospheric pressure.

To facilitate handling during processing and of the resulting products, the reaction is usually conducted in the presence of a diluent, typically an oil of lubricating viscosity. Preferred diluents are substantially free of olefinic unsaturation because olefinic sites in the diluent may compete with the hydrophilic reactant molecules for the carboxylic reactant. To avoid this possibility, it is generally desirable that diluents, when used, be substantially free of olefinic unsaturation. Alternatively, the reaction can take place in a device that provides mechanical working such as in an extruder. When the reaction is conducted in such a device, it is often unnecessary to use a diluent during reaction.

The process of this reaction is typically conducted at ambient pressure. There is normally no advantage in conducting the reaction under reduced pressure or superatmospheric pressure. However, reduced pressure is often used when removing relatively volatile materials such as reaction solvents and by-products such as water from the reaction mixture.

The process is conducted at temperatures ranging from ambient up to the lowest decomposition point of any reactant or of the product. More often, the reaction is conducted at an elevated temperature, for example from about 100° C. up to about 150° C., preferably from about 115° C. up to about 135° C. and more preferably from about 120° C. up to about 125° C.

Reaction times typically range from about 1 to about 24 hours, preferably from about 2 to about 20 hours, more often from about 14 to about 16 hours, and particularly from about 4 to about 7 hours, especially about 6 hours.

The following examples are intended to illustrate several compositions of this invention as well as means for preparing same. It is to be understood that these examples are not intended to limit the scope of the invention. Unless indicated otherwise all parts are parts by weight, temperatures are in degrees Celsius, and pressures in millimeters mercury (mm Hg). Reactions are conducted under nitrogen throughout. Any filtrations are conducted using a diatomaceous earth filter aid. Analytical values are obtained by actual analysis.

EXAMPLE 1

A reactor is charged with 1026 parts of a 15% in mineral oil solution of ethylene-propylene-ethylidene norbornadiene terpolymer having weight average molecular weight ($\overline{M}_w$)=200,000, $\overline{M}_w/\overline{M}_n$=2.6, ethylene:propylene weight ratio of about 52:about 48 and 4 weight % ethylidene norbornadiene, which is heated with stirring and $N_2$ purge to 135° C. To the heated solution is added, over about 0.1 hour, 0.62 parts of linear alkyl benzene sulfonic acid LABS) (98% dodecylbenzene sulfonic acid, Alfa 10818), the materials are stirred for 0.1 hour then 5.28 parts methyl hemiacetal of methyl glyoxylate (GMHA) are added over 0.1 hour. The temperature is increased to 140° C. over 1 hour and is maintained for 4.7 hours. The materials are vacuum stripped to 145° C. and 17 mm Hg pressure over 0.3 hour. The residue (987 parts) is the product. Infrared spectrum shows C=O absorption @ 1746.1 and 1720.1 $cm^{-1}$ and C=C absorption @ 1610 $cm^{-1}$.

EXAMPLE 2

A reactor is charged with 706 parts of a 10% in mineral oil solution of the polymer used in Example 1 which is then heated, under $N_2$ purge to 120° C. To the heated solution are charged 0.16 parts LABS and 2.47 parts GMHA. The temperature is increased to 135° C. and is maintained for 16 hours. The materials are vacuum stripped to 135° C. and 14.5 mm Hg pressure over 0.5 hour. The residue (701.5 parts) is the product. Infrared spectrum shows C=O absorption @ 1736 $cm^{-1}$.

EXAMPLE 3

A reactor is charged with 2790 parts mineral oil (100N, hydrotreated, PetroCanada) and 310 parts of the polymer described in Example 1. The materials are mixed at 100° C. with $N_2$ sparge until polymer is in solution. At 105° C., 0.95 part LABS is added then the temperature is increased to 120° C. whereupon 10.85 parts GMHA are charged, the temperature is increased to 130° C. over 1 hour then is maintained for 6 hours. Total acid number=0.31.

EXAMPLE 4

A reactor is charged with 5796 parts mineral oil (RLOP 100N, hydrotreated, Chevron) and 504 parts ethylene-propylene-ethylidene norbornadiene terpolymer having $\overline{M}_w$=400,000, $\overline{M}_w/\overline{M}_n$=2.8, ethylene:propylene weight ratio of about 52: about 48 and 4.9 weight % ethylidene norbornadiene. The materials are mixed at 100° C. with N₂ sparge until polymer is in solution. At 105° C., 0.95 part LABS is added then the temperature is increased to 120° C. whereupon 10.85 parts GMHA are charged, the temperature is increased to 130° C. over 1 hour then is maintained for 6 hours. The resulting product has total acid number=0.31.

EXAMPLE 5

A reactor is charged with 1321.5 parts of a 10% in oil (Exxon 100N) solution of the polymer described in Example 4. While maintaining N₂, the temperature is increased to 105° C. whereupon 0.89 part LABS is added. The temperature is increased to 120° C. then 4.52 parts GMHA are added. The temperature is increased to 132° C. over 2 hours then is maintained for 10 hours. The resulting material (1288.5 parts) is the product.

EXAMPLE 6

A mixture is prepared by combining 2300 parts of a polybutene-substituted phenol prepared by BF₃-phenol complex catalyzed alkylation of phenol with a polybutene having number average molecular weight of approximately 1000 (vapor phase osmometry), 151.1 parts 50% aqueous glyoxylic acid and 3.86 parts LABS. The mixture is heated to 125° C. under N₂ sweep and temperature is maintained at 125–135° C. for 5 hours.

COMPARATIVE EXAMPLE 1

The procedure of Example 1 is repeated except LABS is replaced with an equivalent amount (acid number basis) of 70% aqueous methanesulfonic acid. Infrared spectrum shows C=O absorption @ 1718.9 and shoulder at 1741.7 cm⁻¹ and C=C absorption @ 1610 cm⁻¹.

Comparing the product of the invention (Example 1) with the comparative product shows more infrared active C=O functionalization in the product of Example 1, indicating more complete reaction.

As noted hereinabove, the products obtained by the process of this invention find utility as intermediates to be further reacted to prepare lubricating oil and fuel additives. For example, the products of this invention may be reacted with at least one reactant selected from the group consisting of (1) an amine characterized by the presence within its structure of at least one HN<group; (2) an alcohol; (3) a reactive metal or a reactive metal compound; and (4) a mixture of two or more of (1) through (3); the components of (4) being reacted with the products of the process of this invention simultaneously or sequentially, in any order, to form derivatives which are useful as performance improving additives for lubricating oils and fuels.

The products of this invention also find utility as performance improving additives for lubricating oils and fuels. The products of this invention and the aforementioned derivatives thereof can be employed in a variety of lubricant basestocks comprising diverse oils of lubricating viscosity, including natural and synthetic lubricating oils and mixtures thereof. These can be used together with other additives commonly employed, such as dispersants, detergents, antiwear and extreme pressure agents, etc.

It is known that some of the materials described above may interact in final formulations, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

Each of the documents referred to above is incorporated herein by reference. Except in the examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A process for reacting a hydrophilic carboxylic reactant selected from the group consisting of compounds of the formula $$R^3C(O)(R^4)_nC(O)OR^5$$

wherein each of $R^3$ and $R^5$ is independently H or an alkyl group of up to 7 carbon atoms, $R^4$ is a divalent alkylene group of 1 to 3 carbon atoms, and n is 0 or 1, and acetals, ketals, hemiacetals, hemiketals, cyclic trimers, and esters thereof, with at least one hydrophobic hydrocarbon based molecule selected from the group consisting of (1) olefinically unsaturated hydrocarbons of at least about 10 carbon atoms and (2) aliphatic hydrocarbyl group substituted hydroxy aromatic compounds wherein the aliphatic hydrocarbyl group is a group of at least 12 carbon atoms; said process comprising conducting the reaction in the presence of a sulfonic acid catalyst having solubilizing properties, wherein the sulfonic acid catalyst is an aliphatic hydrocarbyl group-substituted sulfonic acid of at least 6 carbon atoms in the hydrocarbyl group.

2. The process of claim 1 wherein the aliphatic hydrocarbyl group in the catalyst is an alkyl group of from about 6 to about 30 carbon atoms.

3. The process of claim 1 wherein the sulfonic acid catalyst is an alkyl group substituted cycloaliphatic sulfonic acid wherein the alkyl group is a group of at least 6 carbon atoms.

4. The process of claim 1 wherein the sulfonic acid catalyst is an aliphatic hydrocarbon group substituted aromatic sulfonic acid wherein the hydrocarbon group is a group of from 6 to about 30 carbon atoms.

5. The process of claim 4 wherein the sulfonic acid catalyst is an alkyl substituted benzene sulfonic acid, wherein the alkyl group is a group of from 6 to about 30 carbon atoms.

6. The process of claim 5 wherein the alkyl group is linear.

7. The process of claim 1 wherein the sulfonic acid catalyst is a petroleum sulfonic acid.

8. The process of claim 1 wherein the carboxylic reactant is glyoxylic acid or a hydrate thereof.

9. The process of claim 1 wherein the carboxylic reactant is a lower alkyl hemiacetal of a lower alkyl glyoxylate.

10. The process of claim 1 wherein the hydrophobic molecule is an olefinically unsaturated hydrocarbon of at least 10 carbon atoms.

11. The process of claim 10 wherein the olefinically unsaturated hydrocarbon is an alpha-olefin.

12. The process of claim 10 wherein the olefinically unsaturated hydrocarbon a hydrocarbon of from about 30 carbon atoms to about 37,000 carbon atoms.

13. The process of claim 12 wherein the olefinically unsaturated hydrocarbon a hydrocarbon of from about 50 to about 6,000 carbon atoms.

14. The process of claim 1 wherein the hydrophobic molecule is an aliphatic hydrocarbyl group substituted hydroxy aromatic compound wherein the aliphatic hydrocarbyl group is a group of at least 12 carbon atoms.

15. The process of claim 14 wherein the hydroxy aromatic compound is a phenol and wherein the aliphatic hydrocarbyl group a group of from about 12 to about 200 carbon atoms.

16. The process of claim 15 wherein the aliphatic hydrocarbyl group a group of from about 30 to about 100 carbon atoms.

17. The process of claim 10 wherein the olefinically unsaturated hydrocarbon is an ethylene-$C_{3-28}$ olefin-polyene copolymer.

18. The process of claim 10 wherein the olefinically unsaturated hydrocarbon is an ethylene-propylene-non conjugated diene copolymer.

19. The process of claim 10 wherein the olefinically unsaturated hydrocarbon is a diene-vinyl aromatic copolymer.

20. The process of claim 19 wherein the copolymer is partially hydrogenated.

21. The process of claim 11 wherein the olefinically unsaturated hydrocarbon is a polyisobutylene wherein at least 30% of the polymeric chains have terminal vinylidene groups.

22. The process of claim 11 wherein the olefinically unsaturated hydrocarbon is a polyisobutylene wherein less than 10% of the polymeric chains have terminal vinylidene groups.

23. The process of claim 18 wherein the non conjugated-diene is 5-ethylidene-2-norbornene.

* * * * *